(12) United States Patent
Dutta et al.

(10) Patent No.: US 11,826,830 B2
(45) Date of Patent: Nov. 28, 2023

(54) TURBINE COMPONENTS AND METHODS OF MANUFACTURING

(71) Applicant: GENERAL ELECTRIC COMPANY, Schenectady, NY (US)

(72) Inventors: Sandip Dutta, Greenville, SC (US); Zachary Snider, Simpsonville, SC (US); Srikanth Chandrudu Kottilingam, Greenville, SC (US); Stephen Wassynger, Greenville, SC (US); Joseph Moroso, Greenville, SC (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 10 days.

(21) Appl. No.: 16/916,722

(22) Filed: Jun. 30, 2020

(65) Prior Publication Data
US 2020/0332668 A1 Oct. 22, 2020

Related U.S. Application Data

(62) Division of application No. 15/437,005, filed on Feb. 20, 2017, now Pat. No. 10,731,487.

(51) Int. Cl.
*F01D 9/04* (2006.01)
*B22F 5/04* (2006.01)
(Continued)

(52) U.S. Cl.
CPC ............... *B22F 5/04* (2013.01); *B22F 7/08* (2013.01); *F01D 5/147* (2013.01); *F01D 9/041* (2013.01);
(Continued)

(58) Field of Classification Search
CPC .......... F01D 9/041; F01D 5/147; F01D 9/044; F01D 25/12; B22F 5/04; B22F 7/08;
(Continued)

(56) References Cited

U.S. PATENT DOCUMENTS 10,190,416 B2 * 1/2019 Zscherp ............... F04D 29/666
10,337,404 B2 * 7/2019 McMahan ............. F01D 9/023
(Continued)

FOREIGN PATENT DOCUMENTS

EP 2878767 A1 6/2015
EP 3133245 A1 2/2017
(Continued)

OTHER PUBLICATIONS

International Search Report and Written Opinion issued in connection with corresponding PCT Application No. PCT/US2018/018475 dated May 2, 2018.
(Continued)

*Primary Examiner* — Ryan J. Walters
(74) *Attorney, Agent, or Firm* — McNees Wallace & Nurick LLC

(57) ABSTRACT

At least one turbine component for a gas turbine includes a base component formed by casting and an article. The base component includes a platform. The article on the upper surface of the platform is formed by additive manufacturing. The article has a proximal face sized and shaped to cover at least a portion of the upper surface of the platform of the turbine component and a contoured distal face opposite the proximal face. The contoured distal face has a contour surface serving as at least a portion of a hot gas path surface of the turbine component. The contour surface is arranged and disposed to provide a controlled flow pattern of a working fluid across the contour surface based on a clock mounting location of the turbine component in a turbine.

18 Claims, 5 Drawing Sheets

(51) Int. Cl.
  *F01D 25/12* (2006.01)
  *B22F 7/08* (2006.01)
  *F01D 5/14* (2006.01)
  *B22F 10/28* (2021.01)
  *F04D 29/66* (2006.01)

(52) U.S. Cl.
  CPC ............. *F01D 9/044* (2013.01); *F01D 25/12* (2013.01); *B22F 10/28* (2021.01); *F04D 29/666* (2013.01); *F05D 2220/32* (2013.01); *F05D 2230/21* (2013.01); *F05D 2230/22* (2013.01); *F05D 2230/237* (2013.01); *F05D 2230/31* (2013.01); *F05D 2230/50* (2013.01); *F05D 2240/128* (2013.01); *F05D 2240/80* (2013.01); *F05D 2240/81* (2013.01); *F05D 2260/202* (2013.01); *Y02P 10/25* (2015.11)

(58) Field of Classification Search
  CPC ...... B22F 10/20; B22F 10/00; F05D 2220/32; F05D 2230/21; F05D 2230/22; F05D 2230/237; F05D 2230/31; F05D 2230/50; F05D 2240/128; F05D 2240/80; F05D 2240/81; F05D 2260/202; Y02P 10/25; F04D 29/666
  See application file for complete search history.

(56) References Cited

U.S. PATENT DOCUMENTS

| | | | |
|---|---|---|---|
| 10,436,068 B2* | 10/2019 | Bunker | F02C 3/04 |
| 2009/0257875 A1 | 10/2009 | McCaffrey et al. | |
| 2011/0217159 A1* | 9/2011 | McMahan | F01D 25/08 |
| | | | 415/115 |
| 2012/0301317 A1 | 11/2012 | Alvanos et al. | |
| 2013/0000862 A1 | 1/2013 | Cretegny et al. | |
| 2013/0004331 A1 | 1/2013 | Beeck | |
| 2013/0171001 A1 | 7/2013 | Garcia-Crespo | |
| 2014/0248512 A1 | 9/2014 | Kamel et al. | |
| 2014/0301852 A1* | 10/2014 | Zscherp | F04D 29/324 |
| | | | 29/889.71 |
| 2015/0064020 A1 | 3/2015 | Beeck | |
| 2015/0152736 A1 | 6/2015 | Liang | |
| 2016/0363054 A1 | 12/2016 | Miranda et al. | |
| 2017/0306775 A1 | 10/2017 | Hoskin | |
| 2018/0119570 A1 | 5/2018 | Lacy et al. | |
| 2018/0128174 A1 | 5/2018 | Burnos et al. | |

FOREIGN PATENT DOCUMENTS

| | | |
|---|---|---|
| EP | 3236014 A1 | 10/2017 |
| JP | 2006188962 A | 7/2006 |
| WO | 2015/017093 A1 | 2/2015 |

OTHER PUBLICATIONS

Wang et al., "The microstructure and mechanical properties of deposited-IN718 by selective laser melting", Journal of Alloys and Compounds, vol. 513, pp. 518-523, (2012).

* cited by examiner

TURBINE COMPONENTS AND METHODS OF MANUFACTURING

CROSS-REFERENCE TO RELATED APPLICATIONS

This application is a divisional of U.S. Utility application Ser. No. 15/437,005, filed on Feb. 20, 2017, and entitled "TURBINE COMPONENTS AND METHODS OF MANUFACTURING", the disclosure of which is hereby incorporated by reference in its entirety.

FIELD OF THE INVENTION

The present embodiments are directed to turbine components and methods of manufacturing articles and turbine components. More specifically, the present embodiments are directed toward turbine components with customizable hot gas path surfaces and surface cooling features and methods of manufacturing such turbine components.

BACKGROUND OF THE INVENTION

During operation, high-temperature combustion gases flow through different portions of many gas turbine engines. These high-temperature combustion gases flow over and/or adjacent to various hot gas path components within the gas turbine engine, exposing the components to elevated temperatures during normal operation. As gas turbines are modified to increase efficiency and decrease cost, the temperatures within the hot gas path are being increased while the geometries of the components are becoming more complex. In order to continue increasing the temperatures within the hot gas path, the turbine components in this area must be constructed of materials which can withstand such temperatures.

Conventional discrete transition pieces mounted at discrete clock positions between segments alter the hot gas flow through an otherwise substantially annular channel, particularly along the outer wall of the annular channel. Each conventional non-rotating turbine component is also mounted at a fixed clock position, but the transition piece spacing is not the same as the turbine component spacing.

Turbine components in a particular row in a gas turbine engine, however, are conventionally designed to all have substantially the same structure. Cooling channels in the turbine components are limited by the fabrication techniques. For a non-rotating nozzle, the contour of the nozzle platform and the location of cooling channels in the nozzle platform affect the efficiency of flow of the hot gas past the nozzle, the efficiency of the gas turbine, the efficiency and uniformity of cooling of the nozzle platform, and the effective lifespan of the nozzle platform.

BRIEF DESCRIPTION OF THE INVENTION

In an embodiment, a method of manufacturing includes additive manufacturing an article having a proximal face sized and shaped to cover at least a portion of an upper surface of a platform of a base component and a contoured distal face opposite the proximal face. The base component and the article together form a turbine component. The contoured distal face of the article has a contour surface serving as at least a portion of a hot gas path surface of the turbine component. The contour surface is arranged and disposed to provide a controlled flow pattern of a working fluid across the contour surface based on a mounting location of the turbine component in a turbine.

In another embodiment, a method of manufacturing includes additive manufacturing a set of articles for a set of base components. Each article has a proximal face sized and shaped to cover at least a portion of an upper surface of a platform of one of the set of base components and a contoured distal face opposite the proximal face. The base component and the article together form a turbine component. Each contoured distal face has a contour surface serving as at least a portion of a hot gas path surface of the turbine component. Each contour surface is arranged and disposed to provide a controlled flow pattern of a working fluid across the contour surface based on a mounting location of the turbine component in a turbine.

In another embodiment, at least one turbine component for a gas turbine includes a base component formed by casting and an article. The base component includes a platform. The article on the upper surface of the platform is formed by additive manufacturing. The article has a proximal face sized and shaped to cover at least a portion of the upper surface of the platform of the turbine component and a contoured distal face opposite the proximal face. The contoured distal face has a contour surface serving as at least a portion of a hot gas path surface of the turbine component. The contour surface is arranged and disposed to provide a controlled flow pattern of a working fluid across the contour surface based on a mounting location of the turbine component in a turbine.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are articles, base components, turbine components, and methods of manufacturing of articles, base components, and turbine components.

Embodiments of the present disclosure, for example, in comparison to concepts failing to include one or more of the features disclosed herein, permit a reduction of chargeable coolant flow, increase turbine engine efficiency, increase the overall efficiency of flow of the hot gas past the nozzles, permit the same casting to be used on multiple turbine engines, permit customization of turbine components based on the clock position of their mounting, provide enhanced cooling techniques, provide a surface curvature fine-tuned for a turbine component's specific clock location, increase the efficiency of the gas turbine, increase the efficiency and uniformity of cooling of a hot gas path surface, increase the effective lifespan of the hot gas path surface and hence of the turbine component, or combinations thereof.

Figure 1:
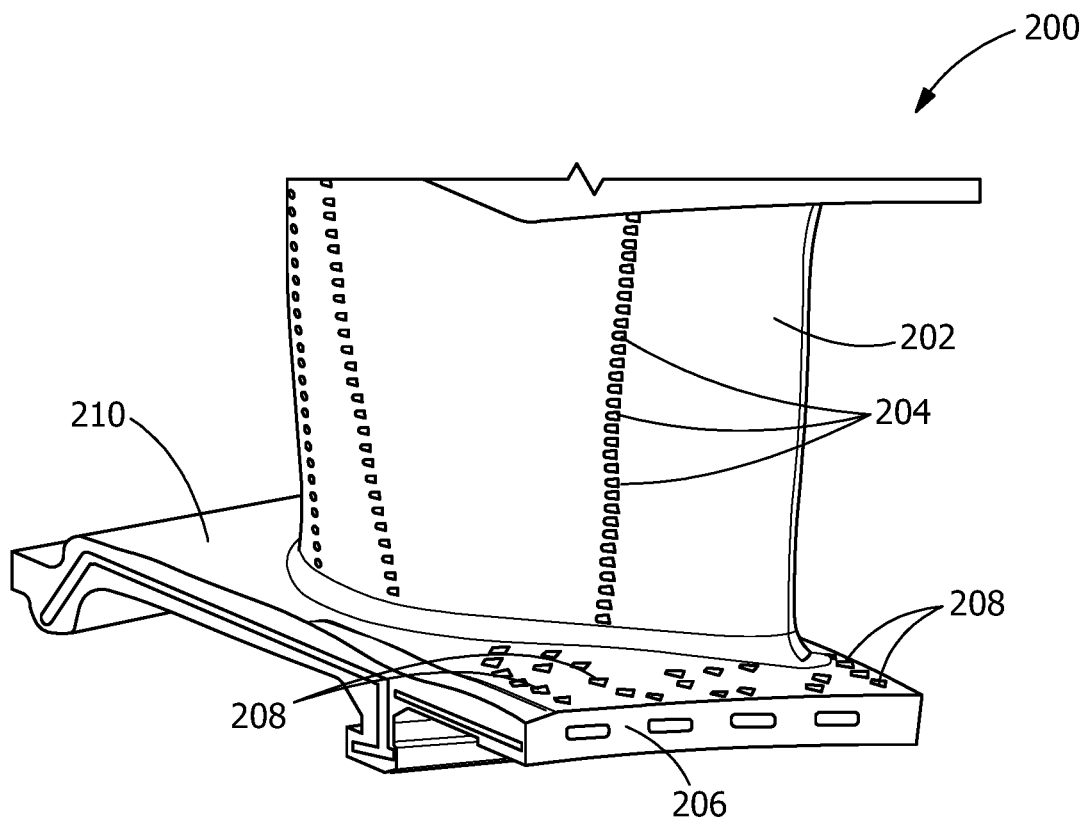
FIG. 1 is a schematic perspective view of a turbine component with a cast end wall core including wall cooling features and airfoil film cooling holes.

Referring to FIG. 1, the turbine component 200 includes an airfoil 202 with rows of film cooling holes 204. The turbine component 200 is a turbine nozzle. The airfoil 202 extends from a platform 206 that includes surface cooling features 208. The airfoil 202 is integral with the platform 206. In FIG. 1, the wall cooling features 208 are film cooling holes. Forming the turbine component 200 by casting decreases the manufacturing cost but limits the contour of the wall cooling features 208 and does not permit variability in the contour of the hot gas path surface 210 of the platform 206. The hot gas path surface 210 is an end wall.

Figure 2:
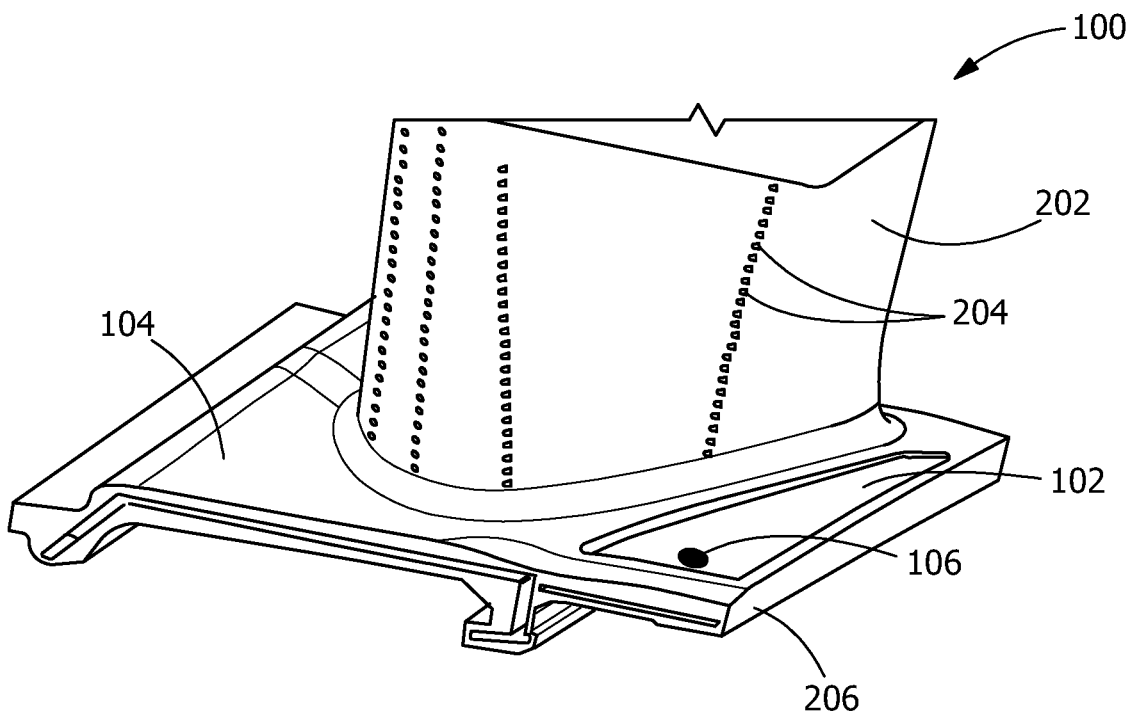
FIG. 2 is a schematic perspective view of a base component in an embodiment of the present disclosure.

Referring to FIG. 2, a base component 100 includes an airfoil 202 with rows of film cooling holes 204. The airfoil 202 extends from a platform 206 that includes a recess 102 in the upper surface 104 of the platform 206. A supply passage 106 fluidly connects the recess 102 with a cooling fluid supply line. The airfoil 202 is integral with the platform 206. The base component 100 is preferably formed by casting, which decreases the manufacturing cost.

Figure 3:
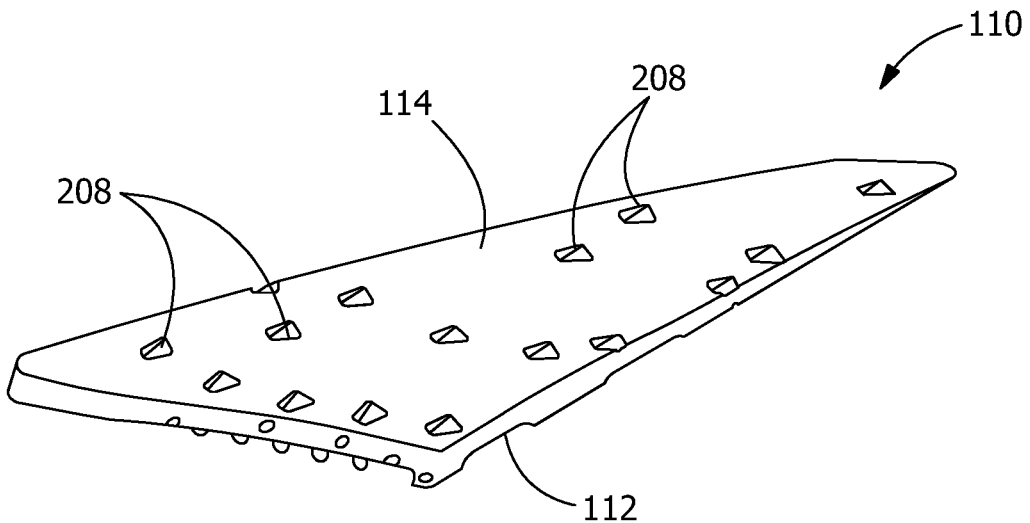
FIG. 3 is a schematic perspective view of an article in an embodiment of the present disclosure.
Figure 4:
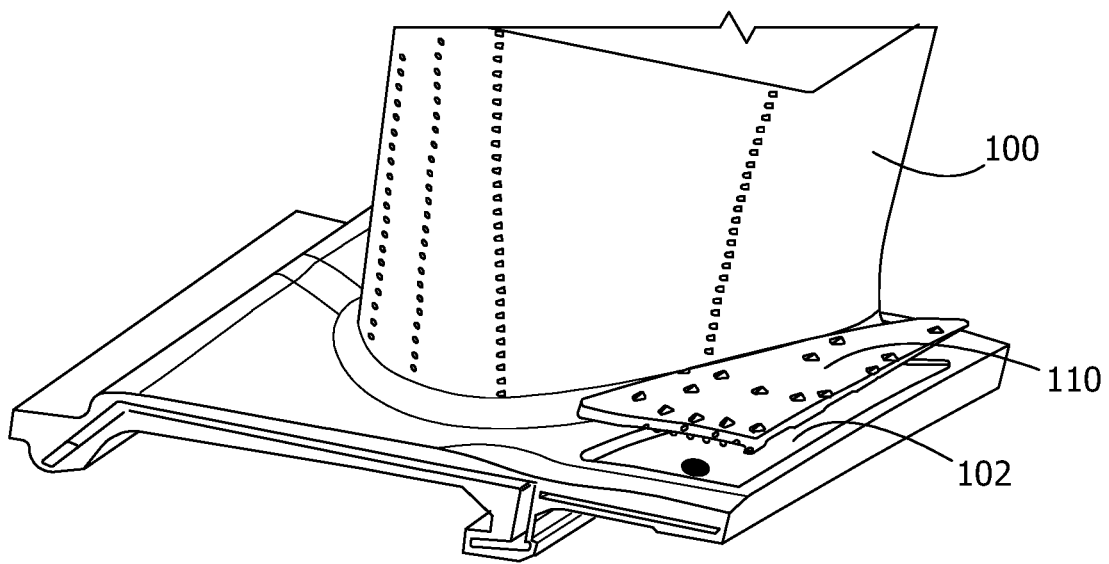
FIG. 4 is a schematic perspective view of the article of FIG. 3 being placed on the base component of FIG. 2.

Referring to FIG. 3, an article 110 is sized and shaped to fit in the recess 102. The article 110 includes a proximal face 112 sized and shaped to cover at least a portion of the upper surface 104 of the base component 100. The article also includes a contoured distal face 114 opposite the proximal face 112. The contoured distal face 114 has a contour surface arranged and disposed to provide a controlled flow pattern of a working fluid across the contour surface based on a mounting location of the base component 100 in a turbine. The article 110 also includes wall cooling features 208. In FIG. 3, the wall cooling features 208 are film cooling holes. In some embodiments, the article 110 contains an advanced cooling circuit that may contain film holes as shown in FIG. 3. The article 110 may also contain microchannel surfaces to be covered with another article 110 in the form of a pre-sintered preform (PSP). FIG. 4 shows the article 110 being placed in the recess 102 of the base component 100.

Figure 5:
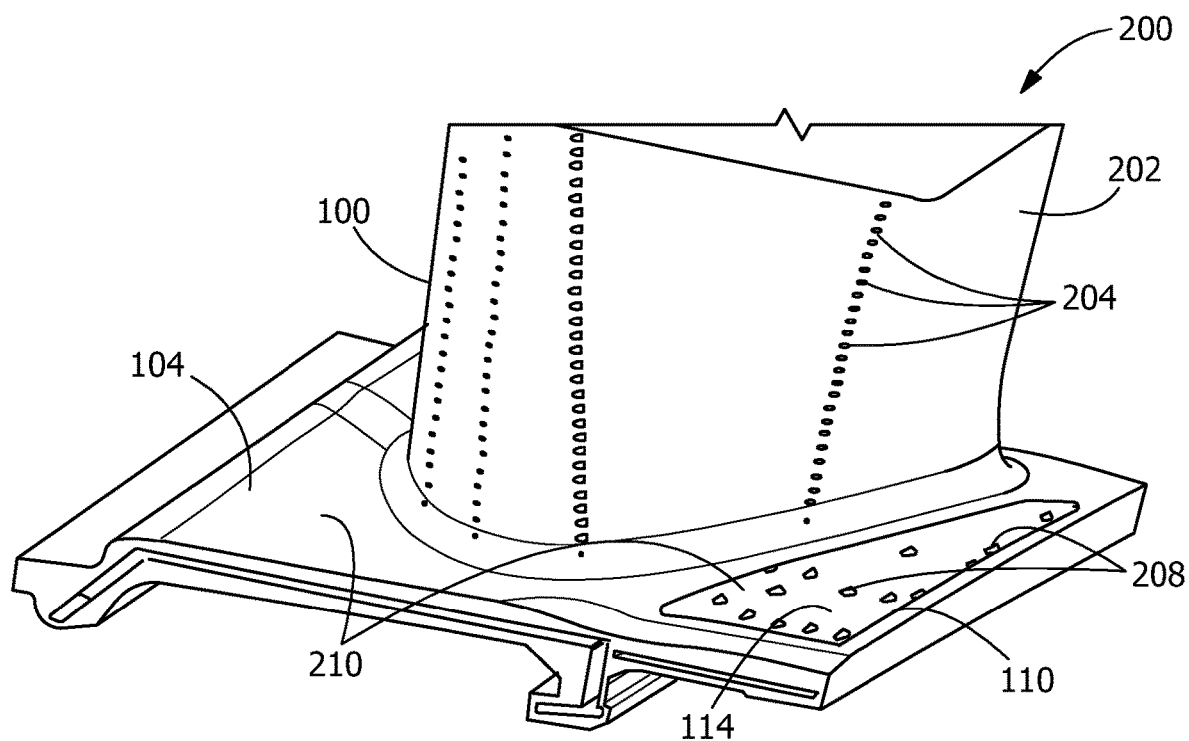
FIG. 5 is a schematic perspective view of a turbine component with the article of FIG. 3 on the base component of FIG. 2.

Referring to FIG. 5, the turbine component 200 includes the base component 100 and the article 110 placed and affixed in the recess 102 on the upper surface 104 of the base component 100. The wall cooling features 208 of the article 110 are in fluid communication with the supply passage 106 of the base component 100. The hot gas path surface 210 of the turbine component 200 includes part of the upper surface 104 of the base component 100 and the contoured distal face 114 of the article 110.

Figure 6:
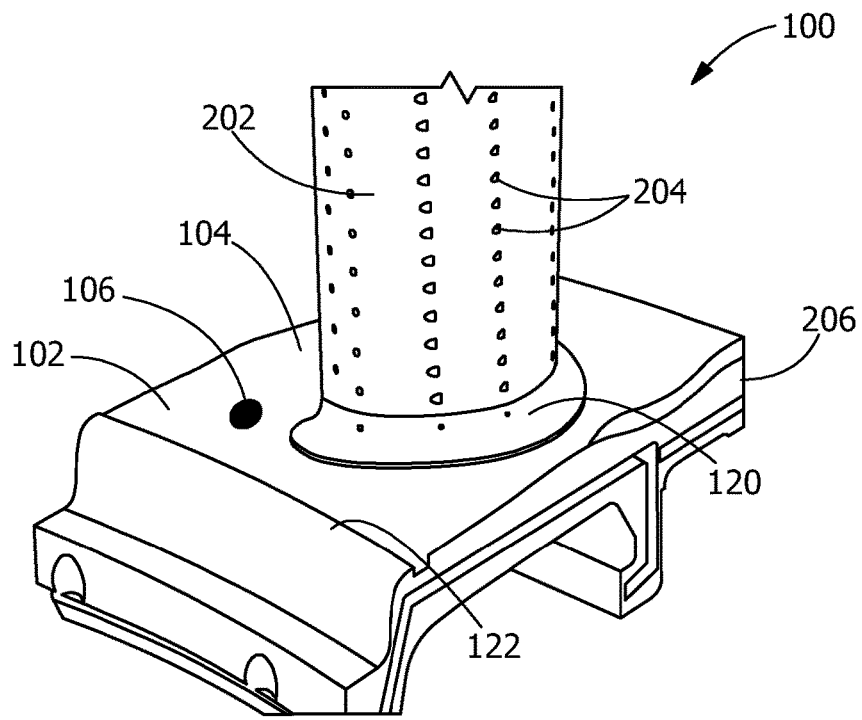
FIG. 6 is a schematic perspective view of a base component with a front wall in an embodiment of the present disclosure.

Referring to FIG. 6, a base component 100 includes an airfoil 202 with rows of film cooling holes 204. The airfoil 202 extends from a platform 206 that includes a recess 102 in the upper surface 104 of the platform 206. The recess 102 covers all or substantially all of the upper surface 104 of the platform 206. The base component 100 in FIG. 6 includes a supply passage 106 fluidly connecting the recess 102 with a cooling fluid supply line, but the base component 100 may alternatively not include such a supply passage 106 in other embodiments. The airfoil 202 is integral with the platform 206. The base component 100 is preferably formed by casting, which decreases the manufacturing cost. The base component 100 includes an airfoil lip 120 and a front lip 122 to aid in positioning the article 110 on the platform 206.

Figure 7:
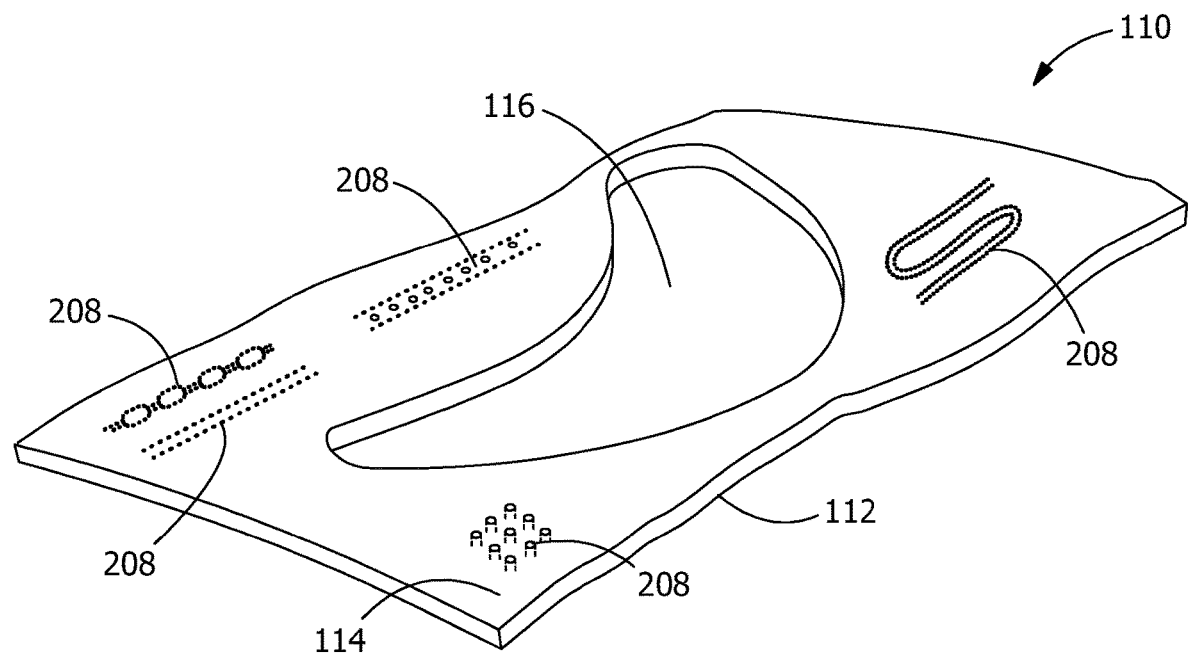
FIG. 7 is a schematic perspective view of another article in an embodiment of the present disclosure.

Referring to FIG. 7, an article 110 is sized and shaped to fit in the recess 102. The article 110 includes a proximal face 112 sized and shaped to cover all or substantially all of the upper surface 104 of the base component 100. The article also includes a contoured distal face 114 opposite the proximal face 112. The contoured distal face 114 has a contour surface arranged and disposed to provide a controlled flow pattern of a working fluid across the contour surface based on a mounting location of the base component 100 in a turbine. The article also includes a central airfoil opening 116 through which the airfoil 202 extends in the turbine component 200.

Figure 8:
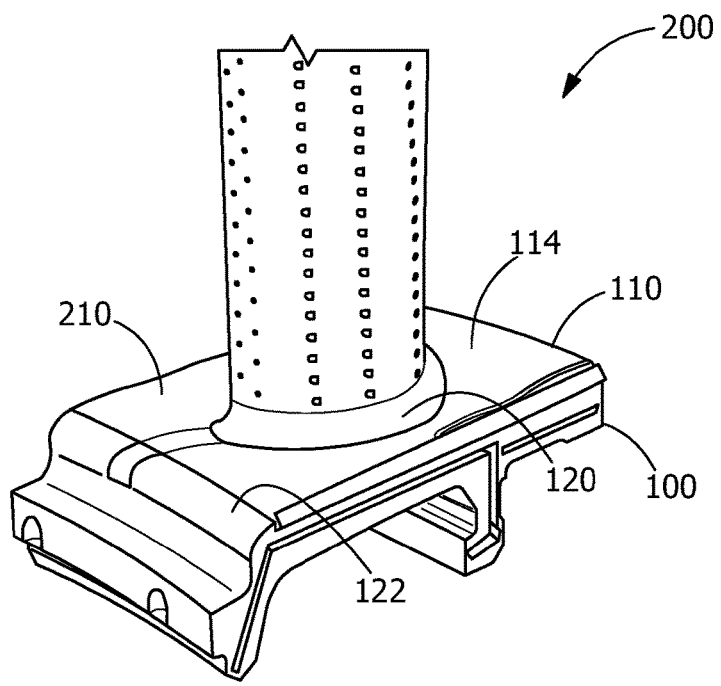
FIG. 8 is a schematic perspective view of a turbine component with the article of FIG. 7 on the base component of FIG. 6.

An article 110 may have one or more wall cooling features 208 that may be cooling channels, cooling holes, or film cooling holes, as shown in FIG. 7. Wall cooling features 208 may include, but are not limited to, pin banks, simple channels, turbulated channels, serpentine channels, impingement channels, and combinations thereof. FIG. 8 shows the article 110 of FIG. 7 placed and affixed in the recess 102 on the upper surface 104 of the base component 100 of FIG. 6 to form the turbine component 200. The front edge of the article 110 meets the front lip 122 and the edge of the airfoil opening 116 of the article 110 meets the airfoil lip 120. The contoured distal face 114 of the article 110 forms substantially all of the hot gas path surface 210 of the turbine component 200.

Figure 9:
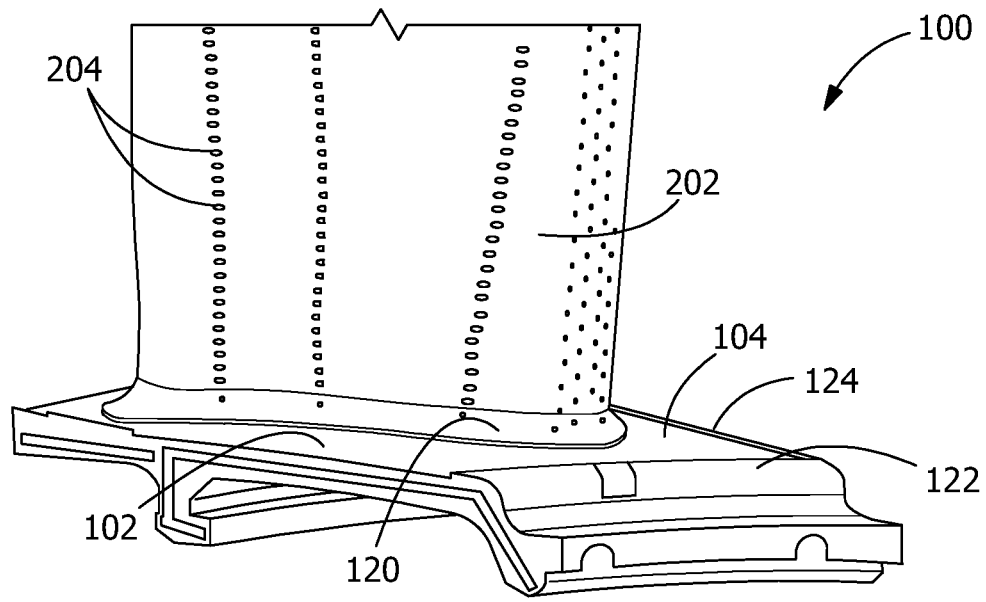
FIG. 9 is a side schematic perspective view of a base component with a front wall and a side wall in an embodiment of the present disclosure.

Referring to FIG. 9, a base component 100 includes an airfoil 202 with rows of film cooling holes 204. The airfoil 202 extends from a platform 206 that includes a recess 102 in the upper surface 104 of the platform 206. The recess 102 covers all or substantially all of the upper surface 104 of the platform 206. The base component 100 in FIG. 8 does not include a supply passage 106 fluidly connecting the recess 102 with a cooling fluid supply line, but the base component 100 may include such a supply passage 106 in other embodiments. The airfoil 202 is integral with the platform 206. The base component 100 is preferably formed by casting, which decreases the manufacturing cost. The base component 100 includes an airfoil lip 120, a front lip 122, and a side lip 124 to aid in positioning the article 110 on the platform 206. The addition of the side lip 124 allows the article 110 to be better positioned on the base component 100 of FIG. 9 than the base component 100 of FIG. 6, which lacks such a side lip 124.

Figure 10:
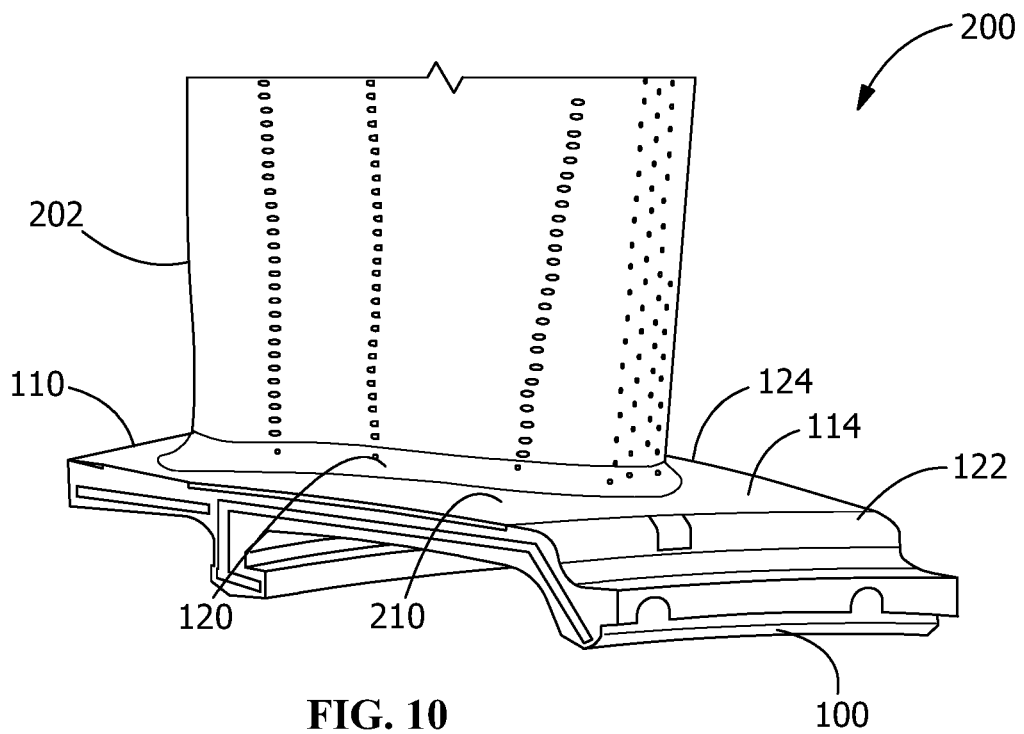
FIG. 10 is a side schematic perspective view of a turbine component with an article on the turbine component of FIG. 9.

FIG. 10 shows the article 110 of FIG. 7 placed and affixed in the recess 102 on the upper surface 104 of the base component 100 of FIG. 9 to form the turbine component 200. The front edge of the article 110 meets the front lip 122, the side edge of the article 110 meets the side lip 124, and the edge of the airfoil opening 116 of the article 110 meets the airfoil lip 120. The contoured distal face 114 of the article 110 forms substantially all of the hot gas path surface 210 of the turbine component 200.

For non-rotating turbine components 200, the flow pattern of the hot gas past a row of turbine components 200 may differ for each turbine component 200 in the row, particularly as a result of the relative location of the upstream transition pieces with respect to each turbine component 200. In other words, the hot gas flow distribution for each turbine component 200 differs depending on its clock mounting location. For a particular arrangement, however, the hot gas flow and temperature distribution are predictable and reproducible, at least to a certain extent, and may be determined empirically or by modeling such that a customized contoured distal face 114 and/or customized wall cooling features 208, which may be cooling channels and/or film cooling holes, may be provided to increase flow efficiency and cooling uniformity at the hot gas path surface 210 or the turbine component 200 based on the predetermined hot gas flow and temperature distribution, thereby increasing overall efficiency of the turbine and part life.

The turbine component 200 may be any component that experiences a different hot gas flow past its surface based on its clock mounting location. As such, the turbine component 200 is preferably a non-rotating component. Turbine components 200 experiencing a different hot gas flow past its surface based on its clock mounting location may include, but are not limited to, turbine nozzles, turbine shrouds, and turbine blades.

In some embodiments, the shape and location of the customized contoured distal face 114 and/or customized wall cooling features 208 are developed based on computer modeling of the hot gas flow. Since it is expensive to maintain different castings for the same type of base component 100, a customized contoured distal face 114 and/or customized wall cooling features 208 are preferably manufactured on top of a set of base components 100 from a single casting, where the shape of the customized contoured distal face 114 and/or customized wall cooling features 208 is based on the location of the turbine component 200 in the engine with respect to the clock mounting location and other components.

The article 110 may be manufactured by any additive manufacturing method or technique including melting or sintering layers of a powder material. In some embodiments, the additive manufacturing or three-dimensional (3D) printing includes selective laser sintering (SLS), direct metal laser sintering (DMLS), selective laser melting (SLM), direct metal laser melting (DMLM), electron beam melting (EBM), powder bed processing, or combinations thereof. In some embodiments, the additive manufacturing or 3D printing includes SLS with a powder bed. The article 110 may alternatively be manufactured by brazing of thin metal sheets of PSP.

In some embodiments, the additive manufacturing of the article 110 is a direct metal laser melting (DMLM) process building an article 110 that is customized in its contoured distal face 114 and/or its wall cooling features 208 for a base component 100 based on a clock mounting location of the base component 100 in a gas turbine. In some embodiments, the DMLM process is performed with a powder delivery assembly including one or more powder material feeders. During the DMLM process, the powder material feeders selectively deliver the powder material and/or any other material directly as a new layer on the powder bed above the printing platform or alternatively to the surface, where at least one spreader directs the powder material toward the printing platform.

In some embodiments, the custom wall cooling features 208 and custom contoured distal face 114 of the article 110 are based on an expected or predetermined hot gas flow pattern at the clock mounting location of the base component 100. In some embodiments, the article 110 is built, such as, for example, by additive manufacturing, directly on top of a base component 100. In other embodiments, the article 110 is built separately and is attached to the base component 100 by a joining technique. In some embodiments, the joining technique may include, but is not limited to, brazing, sintering, welding, direct additive manufacturing on the cast base component 100, or a combination thereof.

In some embodiments, the base component 100 has a recess 102 to receive the article 110 and one or more coolant supply passages 106 to supply the wall cooling features 208 of the article 110, thereby making manufacturing easier and less expensive. The surface contour of the proximal face 112 and/or the contoured distal face 114 of the article 110 preferably does not match the surface contour of the recess 102 and/or the upper surface 104 of the platform 206 of the base component 100 over which the article 110 is placed. The article 110 preferably includes one or more wall cooling features 208, with the base component 100 only having a supply passage 106 for supplying cooling fluid to the wall cooling features 208. The wall cooling features 208 of the article 110 may include complex shapes that would otherwise be too costly to implement if not formed by additive manufacturing. The wall cooling features 208 preferably address local heat loads at the hot gas path surface 210 of the turbine component 200.

In some embodiments, a turbine component 200 may include a base component 100 with both a first article 110, such as shown in FIG. 3, in a recess 102 on the upper surface 104 of the platform 206 of the base component 100, and a second article 110, such as shown in FIG. 7, covering the rest of the upper surface 104 of the platform 206 of the base component 100 and the contoured distal face 114 of the first article 110. Wall cooling features 208 may be located in the first article 110, in the first article 110 and the second article 110, or in neither the first article 110 nor the second article 110.

In some embodiments, the base component 100 may include more than one recess 102 on the upper surface 104 of the platform 206, where each recess 102 receives an article 110 such as shown in FIG. 3.

In some embodiments, the wall cooling features 208 extend through the surface of the hot gas path surface 210 as film cooling holes, as shown in FIG. 3, to release the cooling fluid through the surface of the hot gas path surface 210 and into the hot gas flow stream. In some embodiments, the wall cooling features 208 are near-surface channels that circulate a coolant near but below the surface of the hot gas path surface 210, as shown in FIG. 7.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A set of turbine components for a gas turbine, comprising:
   a first turbine component having a first predetermined clock mounting position within a row of the gas turbine, the first turbine component comprising:
      a first base component formed by casting, the first base component comprising a first platform; and
      a first article on an upper surface of the first platform, the first article being formed by additive manufacturing and having a first proximal face sized and shaped to cover at least a portion of the upper surface of the first platform of the first turbine component and a first contoured distal face opposite the first proximal face, the first contoured distal face having a first contour surface serving as at least a portion of a first hot gas path surface of the first turbine component, the first contour surface being arranged and disposed to provide a first controlled flow of a working fluid across the first contour surface, the first contour surface having a predetermined first shape, independent of any wall cooling features disposed therein or thereon, customized based on a flow pattern of the working fluid predetermined empirically or by modeling at the first predetermined clock mounting position of the first turbine component in the row of the gas turbine; and
   a second turbine component having a second clock mounting position within the row of the gas turbine different from the first clock mounting position, the second turbine component comprising:
      a second base component formed by the casting, the second base component comprising a second platform, the second base component being the same as the first base component; and
      a second article on an upper surface of the second platform, the second article being formed by additive manufacturing and having a second proximal face sized and shaped to cover at least a portion of the upper surface of the second platform of the second turbine component and a second contoured distal face opposite the second proximal face, the second contoured distal face having a second contour surface serving as at least a portion of a second hot gas path surface of the second turbine component, the second contour surface being arranged and disposed to provide a second controlled flow of the working fluid across the second contour surface, the second contour surface having a predetermined second shape, independent of any wall cooling features disposed therein or thereon, customized based on a flow pattern of the working fluid predetermined empirically or by modeling at the second predetermined clock mounting position of the second turbine component in the row of the gas turbine,
   wherein the second shape of the second contour surface is different from the first shape of the first contour surface independent of any wall cooling features disposed in or on the first contour surface or the second contour surface or both of the first contour surface and the second contour surface, and
   wherein the first turbine component and the second turbine component are turbine nozzles, or the first turbine component and the second turbine component are turbine shrouds.

2. The set of turbine components of claim 1, wherein the first proximal face is contoured to define a portion of at least one wall cooling feature between the first proximal face and the first platform such that the at least one wall cooling feature is customized based on the first predetermined clock mounting position of the first turbine component in the gas turbine.

3. The set of turbine components of claim 1, wherein the first article comprises at least one first wall cooling feature and the second article comprises at least one second wall cooling feature, and the at least one first wall cooling feature and the at least one second wall cooling feature are independently selected from the group consisting of at least one cooling channel, at least one cooling hole, and at least one film cooling hole.

4. The set of turbine components of claim 3, wherein the at least one first wall cooling feature is positioned or distributed differently in the first article than the at least one second wall cooling feature is positioned or distributed in the second article.

5. The set of turbine components of claim 1, wherein the first article comprises at least one first wall cooling feature and the second article comprises at least one second wall cooling feature, and the at least one first wall cooling feature and the at least one second wall cooling feature are independently selected from the group consisting of a pin bank, a simple channel, a turbulated channel, a serpentine channel, an impingement channel, and a combination thereof.

6. The set of turbine components of claim 5, wherein the at least one first wall cooling feature is positioned or distributed differently in the first article than the at least one second wall cooling feature is positioned or distributed in the second article.

7. The set of turbine components of claim 1, wherein the first article comprises near-surface channels circulating a cooling fluid near but below the first hot gas path surface of the first turbine component.

8. The set of turbine components of claim 1, wherein the first contour surface is customized based on a hot gas flow determined empirically at the first predetermined clock mounting position.

9. The set of turbine components of claim 1, wherein the first contour surface is customized based on a hot gas flow determined by modeling at the first predetermined clock mounting position.

10. The set of turbine components of claim 1, wherein the first article is brazed to the upper surface of the first platform of the first base component.

11. The set of turbine components of claim 1, wherein the first article is inserted into a recess on the upper surface of the first platform of the first base component.

12. The set of turbine components of claim 11, wherein the first platform comprises a supply passage fluidly connecting the recess with a cooling fluid supply line.

13. The set of turbine components of claim 1, wherein the first base component comprises an airfoil lip and a front lip to aid in positioning the first article on the first platform.

14. The set of turbine components of claim 13, wherein the first base component further comprises a side lip to further aid in positioning the first article on the first platform.

15. The set of turbine components of claim 1, wherein the first article covers the upper surface of the first platform of the first base component.

16. The set of turbine components of claim 1, wherein the first base component further comprises an airfoil portion integrally extending from the first platform.

17. The set of turbine components of claim 16, wherein the first article further comprises a central opening and the airfoil portion extends through the central opening.

18. The set of turbine components of claim 16, wherein the airfoil portion comprises a plurality of rows of film cooling holes.

\* \* \* \* \*